United States Patent
Koo

(10) Patent No.: US 8,498,244 B2
(45) Date of Patent: Jul. 30, 2013

(54) METHOD OF REPORTING CHANNEL QUALITY IN EGPRS SYSTEM

(75) Inventor: Hyounhee Koo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 397 days.

(21) Appl. No.: 12/809,551

(22) PCT Filed: Nov. 26, 2008

(86) PCT No.: PCT/KR2008/006970
§ 371 (c)(1),
(2), (4) Date: Jun. 18, 2010

(87) PCT Pub. No.: WO2009/102109
PCT Pub. Date: Aug. 20, 2009

(65) Prior Publication Data
US 2010/0271971 A1    Oct. 28, 2010

Related U.S. Application Data

(60) Provisional application No. 61/028,449, filed on Feb. 13, 2008, provisional application No. 61/029,124, filed on Feb. 15, 2008, provisional application No. 61/039,435, filed on Mar. 26, 2008, provisional application No. 61/082,836, filed on Jul. 23, 2008.

(30) Foreign Application Priority Data

Apr. 30, 2008  (KR) .................. 10-2008-0040549
Oct. 7, 2008   (KR) .................. 10-2008-0098380

(51) Int. Cl.
*H04W 4/00* (2009.01)
*H04J 3/00* (2006.01)
*H04W 72/00* (2009.01)

(52) U.S. Cl.
USPC ......... 370/328; 370/332; 370/337; 455/452.2

(58) Field of Classification Search
None
See application file for complete search history.

(56) References Cited

U.S. PATENT DOCUMENTS

| | | | | |
|---|---|---|---|---|
| 6,502,063 | B1 * | 12/2002 | Eriksson et al. | 702/190 |
| 6,810,236 | B2 * | 10/2004 | Terry et al. | 455/67.11 |
| 7,092,373 | B2 * | 8/2006 | Parantainen et al. | 370/337 |
| 2002/0080758 | A1 * | 6/2002 | Landais | 370/338 |
| 2003/0202574 | A1 * | 10/2003 | Budka et al. | 375/227 |
| 2004/0218567 | A1 * | 11/2004 | Budka et al. | 370/332 |
| 2008/0259880 | A1 | 10/2008 | Parolari et al. | |
| 2009/0135773 | A1 * | 5/2009 | Aghili et al. | 370/329 |

FOREIGN PATENT DOCUMENTS

EP    1835670 A1    9/2007

OTHER PUBLICATIONS

Aghili et al., U.S. Appl. Ao. 61/027,179, Feb. 8, 2008, priority document for US 2009/0135773.*
3GPP TS 45.008 version 7.10.0 Release 7, Jan. 2008, pp. 71-73.*
3GPP TS 44.060 version 7.10.0 Release 7, Oct. 2007, p. 271.*
Lironi, F. et al.: "Provision of Conversational Services over the GERAN: Technical Solution and Performance"; Personal, Indoor and Mobile Radio Communication, 2007, PIMRC 2007.IEEE 18th International Symposium on; Sep. 3-7, 2007; pp. 1-5.

* cited by examiner

*Primary Examiner* — Faruk Hamza
*Assistant Examiner* — Cassandra Decker
(74) *Attorney, Agent, or Firm* — McKenna Long & Aldridge LLP

(57) ABSTRACT

To report channel quality in RTTI configuration, channel quality parameters for at least one radio block intended for the MS is calculated over a filtering period. A filtering period is two times longer than the time needed to transmit the radio block.

4 Claims, 8 Drawing Sheets

US 8,498,244 B2

METHOD OF REPORTING CHANNEL QUALITY IN EGPRS SYSTEM

This application is a 35 U.S.C. §371 National Stage entry of International Application No. PCT/KR2008/006970, filed on Nov. 26, 2008, and claims priority to U.S. Provisional Application Nos. 61/028,449, filed Feb. 13, 2008, 61/029,124, filed Feb. 15, 2008, 61/039,435, filed Mar. 26, 2008, and 61/082,836, filed Jul 23, 2008, Korean Application No. 10-2008-0040549, filed on Apr. 30, 2008 and Korean Application No. 10-2008-0098380, filed on Oct. 7, 2008 each of which is hereby incorporated by reference in its entirety as if fully set forth herein.

TECHNICAL FIELD

The present invention relates to wireless communications, and more particularly, to a method of reporting channel quality in a wireless communication system based on an enhanced general packet radio service (EGPRS).

BACKGROUND ART

A global system for mobile communication (GSM) is a radio technology which has been developed as a system for standardizing radio communication systems in Europe and which has widely been deployed all over the world. A general packet radio service (GPRS) is introduced to provide a packet switched data service in a circuit switched data service provided from the GSM.

An enhanced data rate for GSM evolution (EDGE) employs 8-phase shift keying (PSK) as well as Gaussian minimum shift keying (GMSK) employed in the GSM. An enhanced general packet radio service (EGPRS) represents the GPRS using the EDGE. An enhanced general packet radio service phase 2 (EGPRS2) supporting further various modulation and coding schemes has recently being developed. While the EGPRS supports only two modulation schemes (i.e., GMSK and 8-PSK), the EGPRS2 supports five modulation schemes (i.e., GMSK, quadrature phase shift keying (QPSK), 8-PSK, 16-quadrature amplitude modulation (QAM), and 32-QAM). There are two levels of the EGPRS2, that is, EGPRS2-A and EGPRS2-B. Up to now, the EGPRS2-A supports the GMSK, 8-PSK, 16-QAM, and 32-QAM, and the EGPRS2-B supports the GMSK, QPSK, 16-QAM, and 32-QAM. To diversify the modulation and coding scheme of the EGPRS2, there is an ongoing standardization task in which the 8-PSK is added to a downlink EGPRS2-B so that the five modulation schemes (e.g., GMSK, QPSK, 8-PSK, 16-QAM, and 32-QAM) are supported when using the EGPRS2-B. Hereinafter, an EGPRS system denotes a system supporting the EGPRS or a system supporting the EGPRS and the EGPRS2.

The EGPRS system provides a multi-data rate by using various modulation and coding schemes. The data rate is regulated on the basis of channel quality in a link adaptation process. If the channel quality is good, data is transmitted with a high data rate. On the contrary, if the channel quality is poor, data is transmitted with a low data rate. Data may be lost when the data is transmitted according to a modulation and coding scheme that requires a data rate higher than that achievable with the channel quality. In link adaptation, a data throughput is increased using a highest possible data rate by using a specific modulation and coding scheme with a predetermined channel quality.

For the link adaptation process, the channel quality needs to be reported from a mobile station (MS) to a base station (BS). In the EGPRS system, the channel quality between the BS and the MS is represented with a bit error probability (BEP). The BEP is an expectation value of an actual bit error rate (BER) of a signal received by the MS through a radio channel. The BEP is measured on a burst-by-burst basis. The BS selects a suitable modulation and coding scheme according to the reported channel quality. The link adaptation can be performed most efficiently when the actual BER is most accurately estimated by the reported BEP.

A reduced transmission time interval (RTTI) configuration is one of techniques introduced in the EGPRS system. Unlike a basic transmission time interval (BTTI) configuration in which one packet data channel (PDCH) is used to configure a radio block consisting of four bursts, in the RTTI configuration, two PDCHs (also referred to as a PDCH-pair) are used to configure the radio block consisting of four bursts. Therefore, a time for transmitting the radio block in the RTTI configuration is only half of that of the BTTI configuration.

The channel quality is required so that a network can know a channel condition and determine an optimal modulation and coding scheme. In an arbitrarily varying channel environment, the channel condition is considered as accurately as possible during a time when the channel quality is reported. However, which scheme will be used in the RTTI configuration to report the channel quality has not been introduced unlike in the BTTI configuration.

DISCLOSURE OF INVENTION

Technical Problem

The present invention provides a method of reporting channel quality in a reduced transmission time interval (RTTI) configuration.

Technical Solution

In an aspect, a method for enabling a mobile station (MS) to report channel quality in a wireless communication system is provided. The method includes calculating channel quality parameters for at least one radio block intended for the MS over a filtering period, wherein a radio block is transmitted on a timeslot-pair in two time division multiple access (TDMA) frames, and wherein the filtering period is two times longer than the time needed to transmit the radio block, and reporting the channel quality parameters to a network.

The wireless communication system may be an Enhanced General Packet Radio Service (EGPRS) system supporting Reduced Transmission Time Interval (RTTI) configuration.

The channel quality parameters may be averaged per timeslot-pair or the channel quality parameters may be calculated per modulation type. The channel quality parameters may be a mean Bit Error Probability (BEP) and a coefficient of variation of BEP.

The at least one radio block intended for the MS may be identified by a Temporary Flow Identity (TFI) included in a Radio Link Control (RLC)/Medium Access Control (MAC) block carried by the radio block.

In another aspect, a mobile station includes a Radio Frequency (RF) unit for transmitting and receiving radio blocks, and a processor coupled to the RF unit and configured to calculate channel quality parameters for at least one radio block intended for the mobile station over a filtering period, wherein a radio block is transmitted on a timeslot-pair in two time division multiple access (TDMA) frames, and report the channel quality parameters.

Advantageous Effects

A reduced transmission time interval (RTTI) configuration can be implemented in a similar manner used in a conventional basic transmission time interval (BTTI) configuration. Therefore, performance of a link adaptation process can be improved while not having a significant effect on a complexity in a mobile station.

MODE FOR THE INVENTION

Figure 1:
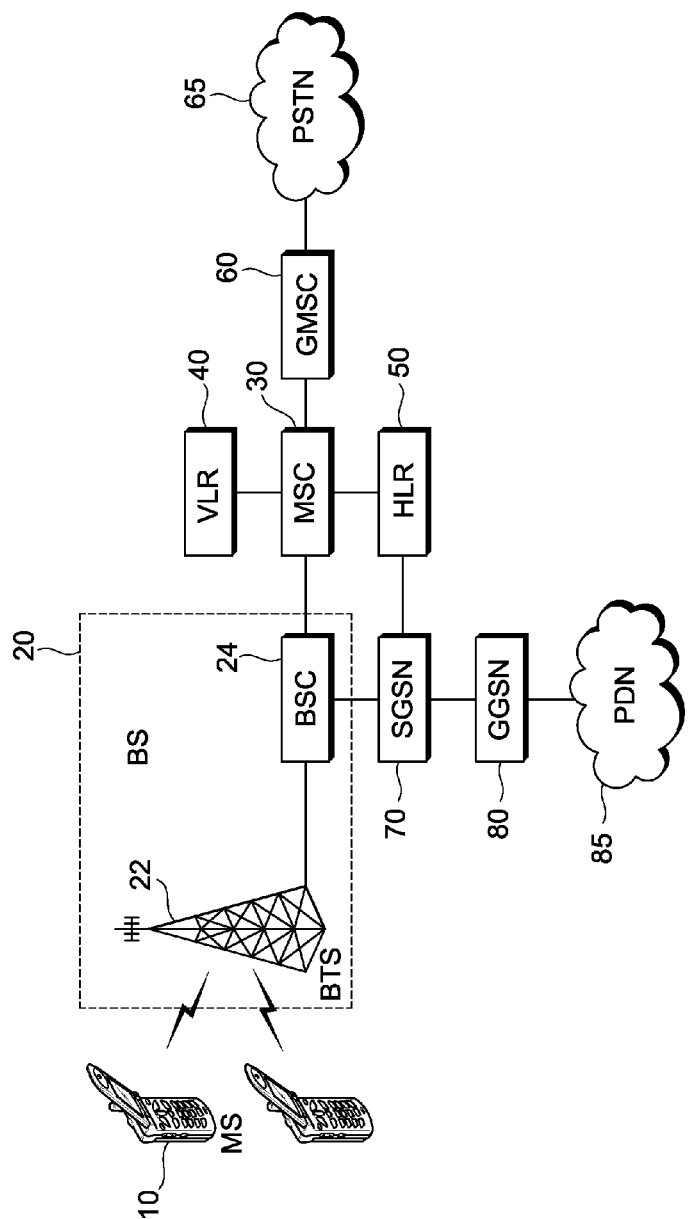
FIG. 1 is a block diagram showing a wireless communication system.

FIG. 1 is a block diagram showing a wireless communication system. The wireless communication system may support an enhanced general packet radio service (EGPRS). The wireless communication systems are widely used to provide a variety of communication services such as voice, packet data, and so on.

Referring to FIG. 1, a mobile station (MS) 10 is a communication instrument carried by a user and may be called other terms such as a user equipment (UE), a user terminal (UT), a subscriber station (SS), a wireless device, etc.

A base station (BS) 20 includes a base transceiver station (BTS) 22 and a base station controller (BSC) 24. The BTS 22 communicates with the MS 10 in one cell area through a radio interface, and performs a synchronization function with the MS 10. The BSC 24 interfaces at least one BTS 22 with a mobile switching center (MSC) 30.

The MSC 30 connects the BS 20 to a different kind of a network such as a public switching telephone network (PSTN) 65 or a public land mobile network (PLMN) through a gateway MSC (GMSC) 60. A visitor location register (VLR) 40 stores temporary user data, and includes information regarding the roaming of all the MSs 10 in a service area of the MSC 30. A home location register (HLR) 50 includes information regarding all subscribers in the home networks. A serving GPRS support node (SGSN) 70 takes charge of mobility management of the subscribers. A gateway GPRS data network (GGSN) 80 routes a packet at the current position of the MS 10 to interface the MS with an external packet data network such as a public data network (PDN) 85.

A temporary block flow (TBF) is a logical connection offered by two medium access control (MAC) entities so as to support the unidirectional transfer of a radio link control (RLC) protocol data unit (PDU) on basic physical subchannels. The TBF is not provided in a packet idle mode. In the packet idle mode, any radio resource on a packet data physical channel is not assigned to the MS. At least one TBF is provided in a packet transfer mode. In the packet transfer mode, radio resources on one or more packet data physical channels for the transfer of packet data are assigned to the MS. A MAC-idle state means a MAC-control-entity state where no basic physical subchannel is assigned. A temporary flow identity (TFI) is assigned to each TBF by the network. The MS assumes that the TFI value is unique among concurrent TBFs in the same direction (uplink or downlink) on all packet data channels (PDCHs) used for the TBFs.

Figure 2:
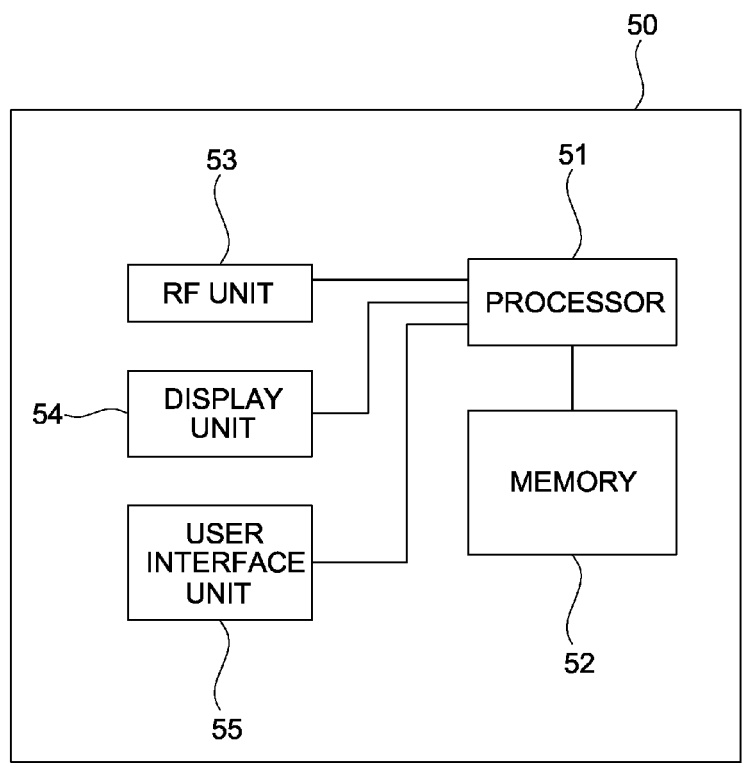
FIG. 2 is a block diagram showing constitutional elements of a mobile station.

FIG. 2 is a block diagram showing constitutional elements of the MS. An MS 50 includes a processor 51, a memory 52, a radio frequency (RF) unit 53, a display unit 54, and a user interface unit 55. The memory 52 is coupled to the processor 51 and stores an operating system, applications, and general files. The display unit 54 displays a variety of information of the MS 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

The processor 51 measures and reports channel quality for radio blocks received through the RF unit 53, and reports the measured channel quality to the BS.

Hereinafter, packet data logical channels is disclosed. A packet common control channel (PCCCH) includes logical channels for common control signaling used in packet data, such as, a packet random access channel (PRACH), a packet paging channel (PPCH), and a packet access grant channel (PAGCH). The PRACH is used by an MS for starting uplink transmission. A packet access burst is used on the PRACH. The PPCH is used to page the MS prior to the transfer of a downlink packet. The PAGCH is used to transmit resource allocation to the MS prior to the transfer of packets in a packet transfer establishment phase. A packet broadcast control channel (PBCCH) is used to broadcast specific system information of packet data. A packet data traffic channel (PDTCH) is allocated for the transfer of data. The PDTCH may be dedicatedly allocated to one MS or may be allocated to a group of MSs in case of one-to-many transmission. A packet associated control channel (PACCH) carries signaling information, which includes a confirmation and power control information related to a specific MS, and resource allocation information. A packet timing advance control channel/uplink (PTCCH/U) is used to transmit a random access burst for estimating a timing advance for one MS in a packet transfer mode. A packet timing advance control channel/downlink (PTCCH/D) is used to transmit a timing advance information update to a plurality of MSs. One PTCCH/D consists of a plurality of PTCCH/U pairs.

The packet data logical channels are mapped to physical channels dedicated for packet data. Other packet data logical channels can appear on the same physical channel. The PRACH or the PTCCH/U uses an access burst. Most of other packet data logical channels use a radio block including four normal bursts. The burst is defined as an amount of information transmitted within one timeslot.

The PDTCH is mapped to a packet data channel (PDCH) that is a physical channel. The PDCH is defined as a physical channel dedicated for packet data traffic. In case of a basic transmission time interval (BTTI) configuration, one PDCH is mapped to the PDTCH. In case of a reduced transmitted time interval (RTTI) configuration, two PDCHs (referred to as a PDCH-pair) are mapped. For one TBF, up to 8 PDCHs (or 4 PDCH-pairs), which have the same frequency parameter and different timeslot numbers, can be simultaneously allocated to the MS.

Figure 3:
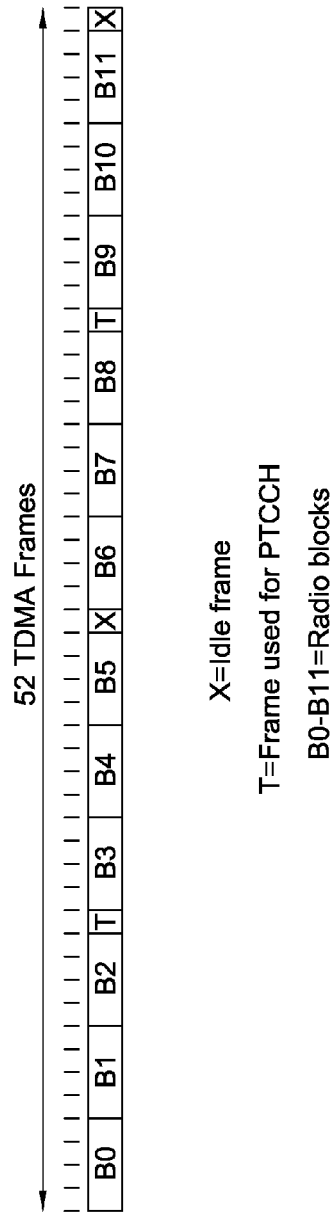
FIG. 3 shows a multi-frame structure in a basic transmission time interval (BTTI) configuration.

FIG. 3 shows a multi-frame structure in the BTTI configuration. Mapping of logical channels on time domain is defined using a multi-frame structure. In the BTTI configuration, a multi-frame structure for a PDCH is constructed of 52 time division multiple access (TDMA) frames. The 52 TDMA frames are divided into two idle frames, two TDMA frames for a PTCCH, and 12 radio blocks each of which consists of four TDMA frames.

Figure 4:
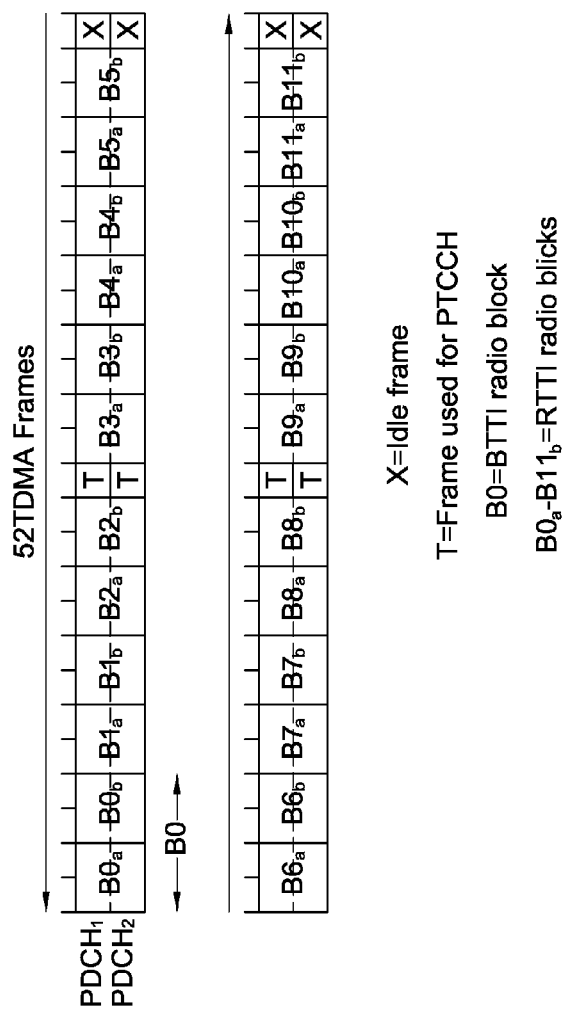
FIG. 4 shows a multi-frame structure in a reduced transmission time interval (RTTI) configuration.

FIG. 4 shows a multi-frame structure in the RTTI configuration. The multi-frame structure is constructed of 52 TDMA frames. However, since two PDCHs are used, a radio block is transmitted on a PDCH-pair (i.e., two timeslots) within two TDMA frames. A first block B0 is used for a PBCCH in downlink.

In the BTTI configuration, the radio block consists of four consecutive bursts on one timeslot within four consecutive TDMA frames. In comparison thereto, in the RTTI configuration, the radio block consists of two bursts on a timeslot-pair within two consecutive TDMA frames.

Figure 5:
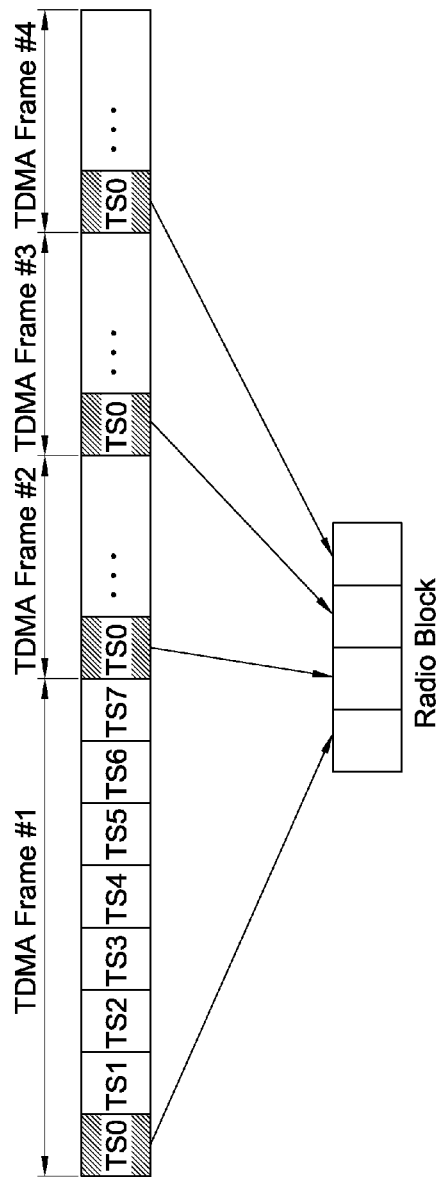
FIG. 5 shows a concept of a radio block in a BTTI configuration.

FIG. 5 shows a concept of a radio block in the BTTI configuration.

Referring to FIG. 5, one TDMA frame includes 8 timeslots TS0, TS1, . . . , and TS7 in a GPRS/EGPRS system. The radio block consists of bursts included in four timeslots belonging to four consecutive TDMA frames. For example, the radio block may be configured by selecting 1st timeslots TS0 of the four consecutive frames one by one. Although the 1st timeslot TS0 is selected herein for example, it is also possible to select other timeslots.

Figure 6:
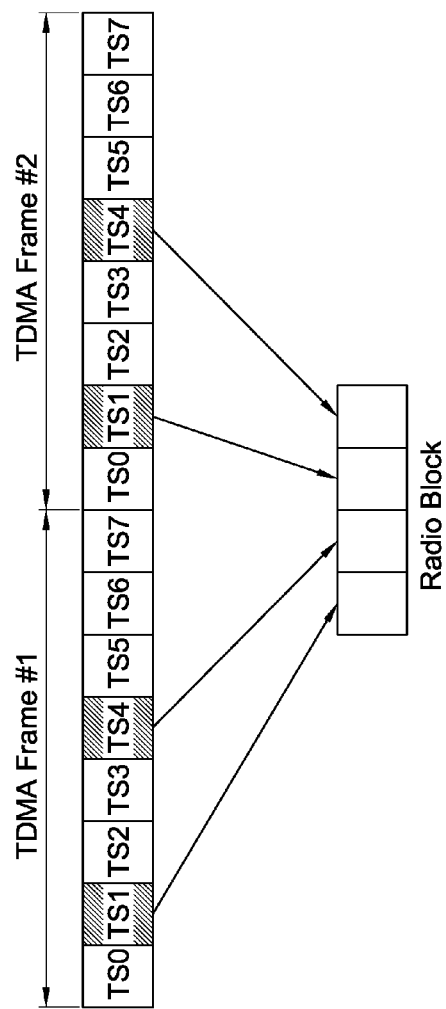
FIG. 6 shows a concept of a radio block in an RTTI configuration.

FIG. 6 shows a concept of a radio block in the RTTI configuration.

Referring to FIG. 6, the radio block consists of bursts included in four timeslots belonging to two TDMA frames. For example, the radio block may be configured by selecting a 2nd timeslot TS1 and a 5th timeslot TS4 from each TDMA frame of the two consecutive TDMA frames. Although the 2nd timeslot TS1 and the 5th timeslot TS4 are selected herein for example, it is also possible to select other timeslots.

A channel, i.e. a timeslot sequence, uses the same timeslot number in every TDMA frame and is defined by a timeslot number and a TDMA frame number sequence. A timeslot sequence is regarded as a timeslot unless there is any explicit different explanation in this description.

According to the RTTI configuration, a time for transmitting one radio block is half of that of the BTTI configuration. This is because four TDMA frames (i.e., 20 millisecond (ms)) are required to transmit one radio block in the BTTI configuration, whereas two TDMA frames (i.e., 10 ms) are sufficient in the RTTI configuration.

Hereinafter, channel quality measurement in an EGPRS system is disclosed.

When EGPRS channel quality is reported, a received signal quality of each PDCH is measured on a burst-by-burst basis. A bit error probability (BEP) measured on a burst-by-burst basis is a physical parameter for reporting the EGPRS channel quality. According to the BEP, an MS obtains a mean BEP (i.e., MEAN_BEP) and a coefficient of variation of BEP (i.e., CV_BEP) which are channel quality parameters.

To obtain the channel quality parameters, the MS stores BEPs measured from four bursts for each PDCH in a memory. A mean BEP (i.e., MEAN_BEP) for an n-th radio block consisting of four bursts can be obtained as shown:

MathFigure 1

$$\text{MEAN\_BEP}_{block,n} = \frac{1}{4}\sum_{i=1}^{4} BEP_{burst\ i} \qquad [\text{Math. 1}]$$

where $BEP_{burst\ i}$ denotes a BEP measured from an i-th burst. A burst denotes information carried on a timeslot. Here, one timeslot means a single timeslot in one TDMA frame.

A coefficient of variation of BEP (i.e., CV_BEP) for the n-th radio block can be obtained according to Equation 2 below.

MathFigure 2

$$\text{CV\_BEP}_{block,n} = \frac{\sqrt{\frac{1}{3}\sum_{k=1}^{4}\left(BEP_{burst\ k} - \frac{1}{4}\sum_{i=1}^{4}BEP_{burst\ i}\right)^2}}{\frac{1}{4}\sum_{i=1}^{4}BEP_{burst\ i}} \qquad [\text{Math. 2}]$$

The MS measures a BEP in a burst unit and then obtains the MEAN_BEP and the CV_BEP. In addition, the MS performs an average operation for each PDCH and for each modulation scheme in every filtering period (e.g., 20 ms). The filtering period is a time corresponding to one radio block in the BTTI configuration. A reliability $R_n$ of quality parameters for each modulation scheme is defined as shown:

MathFigure 3

$$R_n = (1-e)\cdot R_{n-1} + e\cdot x_n,\ R_{-1}=0 \qquad [\text{Math. 3}]$$

where n denotes an iteration index which is increased for each downlink radio block. e denotes a forgetting factor for performing individual filtering on each MS. The forgetting factor e can be determined according to a BEP period transmitted from a BS. $x_n$ is a value indicating a presence/absence of a quality parameter of the n-th radio block for each modulation scheme. The value $x_n$ may be '0' or '1' according to the presence/absence of the quality parameter. The forgetting factor is used to regulate a ratio between a previous channel quality parameter and a current channel quality parameter.

Herein, the filtering period is for filtering the MEAN_BEP and the CV_BEP. In every filtering period, a reliability Rn of channel quality parameters filtered for each modulation scheme is obtained. The reliability Rn is used to obtain a previously filtered channel quality parameter obtained in a previous filtering period and a currently filtered channel quality parameter obtained from a current MEAN_BEP and a current CV_BEP. If it is assumed that each filtering period (e.g., 20 ms) is a current time, it can be regarded that the four bursts constituting the radio block are simultaneously received since values of the current time are equally averaged throughout the filtering period.

By using the reliability, the MS obtains the MEAN_BEP and CV_BEP corresponding to all assigned PDCHs (or timeslots) with respect to radio blocks having a TFI of the MS itself according to the following equations.

MathFigure 4

$$\text{MEAN\_BEP\_TN}_n = \left(1 - e\frac{x_n}{R_n}\right) \cdot \text{MEAN\_BEP\_TN}_{n-1} + e\frac{x_n}{R_n} \cdot \text{MEAN\_BEP}_{block,n} \quad [\text{Math. 4}]$$

MathFigure 5

$$\text{CV\_BEP\_TN}_n = \left(1 - e\frac{x_n}{R_n}\right) \cdot \text{CV\_BEP\_TN}_{n-1} + e\frac{x_n}{R_n} \text{CV\_BEP}_{block,n} \quad [\text{Math. 5}]$$

The channel quality is obtained with respect to radio blocks for one timeslot per TDMA frame. If it is necessary for the MS to report the channel quality for each timeslot, values obtained by Equations 4 and 5 above are transmitted to the BS.

In the EGPRS system, a plurality of timeslots can be assigned to the MS. Thus, for each modulation scheme, the MEAN_BEP and the CV_BEP are obtained by performing an averaging operation over all assigned channels (or timeslots) according to the following equations.

MathFigure 6

$$\text{MEAN\_BEP}_n = \frac{\sum_j R_n^{(j)} \cdot \text{MEAN\_BEP\_TN}_n^{(j)}}{\sum_j R_n^{(j)}} \quad [\text{Math. 6}]$$

MathFigure 7

$$\text{CV\_BEP}_n = \frac{\sum_j R_n^{(j)} \cdot \text{CV\_BEP\_TN}_n^{(j)}}{\sum_j R_n^{(j)}} \quad [\text{Math. 7}]$$

Herein, n denotes an iteration index at a time of reporting, and j denotes a channel number. When a new cell is selected or when an MS enters a packet transfer mode, the iteration index n is reset to '0'. If a new timeslot is assigned for a downlink TBF, then a MEAN_BEP_TN$_{n-1}$, CV_BEP_TN$_{n-1}$, and R$_{n-1}$ for that timeslot are reset to '0 '. n increases for each radio block. If it is necessary for the MS to report channel quality for all assigned timeslots, values obtained by Equations 6 and 7 above are transmitted to the BS.

The MS calculates a MEAN_BEP_TN$_n$ and CV_BEP_TN$_n$ for each PDCH and for each modulation scheme in every filtering period (i.e., 20 ms), and continuously calculates a MEAN_BEP$_n$ and CV_BEP$_n$ for each modulation scheme when it is time to report the measurement result to a network.

In summary, the MS measures BEPs for the four bursts constituting the n-th radio block. The MS obtains a MEAN_BEP$_{block,n}$ and CV_BEP$_{block,n}$ by averaging the measured BEPs. The MS obtains a MEAN_BEP_TN$_n$ and CV_BEP_TN$_n$ filtered for each assigned timeslot in every filtering period (i.e., 20 ms). In addition, the MS calculates a MEAN_BEP$_n$ and CV_BEP$_n$ for all assigned timeslots when it is time to report the total MEAN_BEP and CV_BEP.

Figure 7:
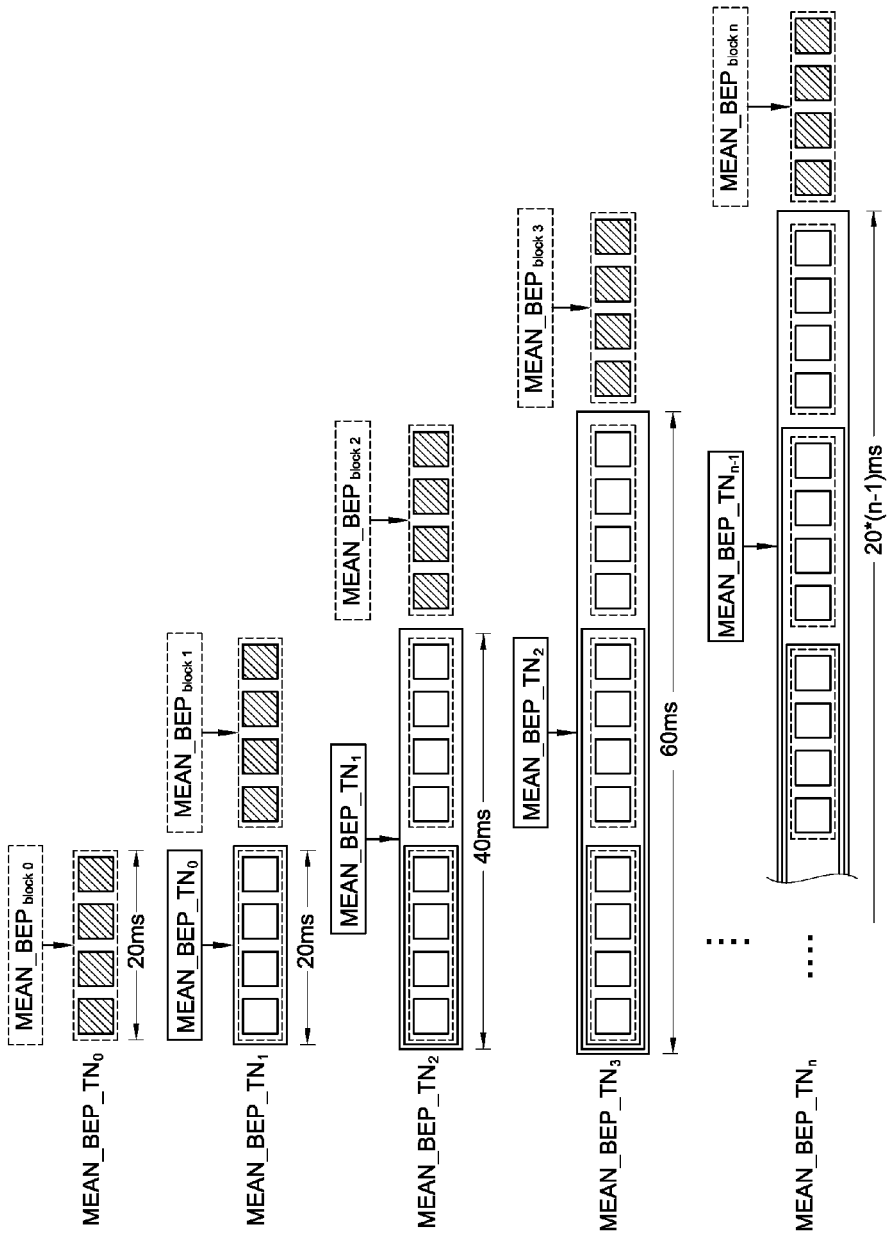
FIG. 7 shows channel quality measurement in a BTTI configuration.

FIG. 7 shows channel quality measurement in the BTTI configuration. Striped boxes denote BEP values for current bursts and white boxes denote BEP values for previous bursts.

Referring to FIG. 7, BEPs for four bursts are first averaged to obtain a MEAN_BEP$_{block,0}$. If a duration of current values is 20 ms, the MEAN_BEP$_{block,0}$ is equal to a MEAN_BEP_TN$_0$.

Next, BEPs for four bursts are averaged to obtain a MEAN_BEP$_{block,1}$. A MEAN_BEP_TN$_1$ is obtained using the previous MEAN_BEP_TN$_0$ and the MEAN_BEP$_{block,1}$.

In the same manner, a MEAN_BEP$_{block,2}$ and MEAN_BEP_TN$_2$, a MEAN_BEP$_{block,3}$ and MEAN_BEP_TN$_3$, ..., and a MEAN_BEP$_{block,n}$, and MEAN_BEP_TN$_n$ are sequentially obtained. As a result, a duration of previous values is 20(n−1)ms, and a duration of current values is 20 ms.

Figure 8:
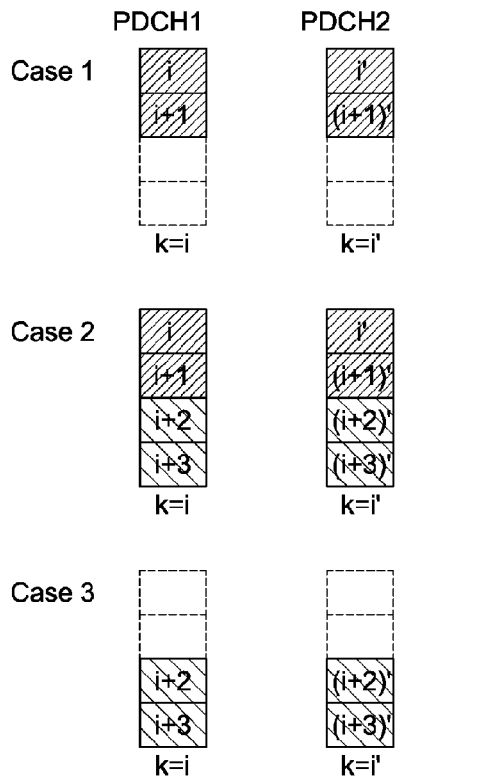
FIG. 8 shows an example showing channel quality measurement according to an embodiment of the present invention.

FIG. 8 shows an example showing channel quality measurement according to an embodiment of the present invention. Two consecutive radio blocks are used to measure channel quality in the RTTI configuration. The two consecutive radio blocks consist of a PDCH-pair (or timeslot-pair) including a PDCH1 and a PDCH2.

Referring to FIG. 8, a MEAN_BEP and a CV_BEP are obtained for the two consecutive radio blocks in the PDCH-pair. In an EGPRS/EGPRS2 system, a modulation scheme A may be any one of Gaussian minimum shift keying (GMSK), quadrature phase shift keying (QPSK), 8-phase shift keying (PSK), 16-quadrature amplitude modulation (QAM), and 32-QAM.

A first case (i.e., Case 1 of FIG. 8) is a case where there is no data for a second radio block in the two consecutive radio blocks or where the two radio blocks have different modulation schemes. An MS obtains a mean BEP (i.e., MEAN_BEP) for one radio block consisting of four bursts according to Equation 8 below.

MathFigure 8

$$\text{MEAN\_BEP}_{block} = \frac{1}{2} \sum_{j=k}^{k+1} BEP_{burst\ j} \quad [\text{Math. 8}]$$

A coefficient of variation of BEP (i.e., CV_BEP) for the radio block is obtained according to Equation 9 below.

MathFigure 9

$$\text{CV\_BEP}_{block} = \frac{\sqrt{\sum_{n=k}^{k+1}\left(BEP_{burst\ n} - \frac{1}{2}\sum_{j=k}^{k+1} BEP_{burst\ j}\right)^2}}{\frac{1}{2}\sum_{j=k}^{k+1} BEP_{burst\ j}} \quad [\text{Math. 9}]$$

A second case (i.e., Case 2 of FIG. 8) is a case where allocated two consecutive radio blocks have the same modulation scheme. The MS obtains a mean BEP (i.e., MEAN_BEP) for one radio block consisting of four bursts according to Equation 10 below.

MathFigure 10

$$\text{MEAN\_BEP}_{block} = \frac{1}{4} \sum_{j=k}^{k+3} BEP_{burst\ j} \quad [\text{Math. 10}]$$

A coefficient of variation of BEP (i.e., CV_BEP) for the radio block is obtained according to Equation 11 below.

MathFigure 11

$$CV\_BEP_{block} = \frac{\sqrt{\frac{1}{3}\sum_{n=k}^{k+3}\left(BEP_{burst\ n} - \frac{1}{4}\sum_{j=k}^{k+3}BEP_{burst\ j}\right)^2}}{\frac{1}{4}\sum_{j=k}^{k+3}BEP_{burst\ j}}$$ [Math. 11]

A third case (i.e., Case 3 of FIG. 8) is a case where there is no data for a first radio block in the two consecutive radio blocks or where the two radio blocks have different modulation schemes. The MS obtains a mean BEP (i.e., MEAN_BEP) for one radio block consisting of four bursts according to Equation 12 below.

MathFigure 12

$$MEAN\_BEP_{block} = \frac{1}{2}\sum_{j=k+2}^{k+3}BEP_{burst\ j}$$ [Math. 12]

A coefficient of variation of BEP (i.e., CV_BEP) for the radio block is obtained according to Equation 13 below.

MathFigure 13

$$CV\_BEP_{block} = \frac{\sqrt{\sum_{n=k+2}^{k+3}\left(BEP_{burst\ n} - \frac{1}{2}\sum_{j=k+2}^{k+3}BEP_{burst\ j}\right)^2}}{\frac{1}{2}\sum_{j=k+2}^{k+3}BEP_{burst\ j}}$$ [Math. 13]

Equations 8 to 13 above can be generalized as follows.

MathFigure 14

$$MEAN\_BEP_{block} = \frac{1}{m}\sum_{a=i}^{i+3}x_a \cdot BEP_{burst\ a}$$ [Math.14]

MathFigure 15

$$CV\_BEP_{block} = \frac{\sqrt{\frac{1}{m-1}\sum_{b=i}^{i+3}x_b \cdot \left(BEP_{burst\ b} - \frac{1}{m}\sum_{a=i}^{i+3}x_a \cdot BEP_{burst\ a}\right)^2}}{\frac{1}{m}\sum_{a=i}^{i+3}x_a \cdot BEP_{burst\ a}}$$ [Math. 15]

Herein, m is 4 if two radio blocks having the same modulation scheme exist throughout a filtering period (e.g., 20 ms), and m is 2 if one radio block exists throughout the filtering period. $x_a$ and $x_b$ denote existence of a-th and b-th bursts for an (i/2)th or ((i/2)+1)th radio block. Values of the $x_a$ and $x_b$ indicate '1' in the presence of bursts in the radio block, and indicate '0' in the absence of the bursts in the radio block.

By using the MEAN_BEP and CV_BEP obtained as described above, Equations 4 to 7 above can be used directly so that the MS calculates a $MEAN\_BEP\_TN_n$ and $CV\_BEP\_TN_n$ for each PDCH and for each modulation scheme in every 20 ms, and continuously calculates a $MEAN\_BEP_a$ and $CV\_BEP_n$ for each modulation scheme when it is time to report the measurement result to a network.

In the process of reporting channel quality in the RTTI configuration, the channel quality can be measured in the same unit (i.e., 20 ms) used in the BTTI configuration. In addition, performance deterioration can be minimized in the RTTI configuration even when using the same forgetting factor used in BTTI configuration. The reason above is that, although a channel quality parameter is calculated for an allocated radio block in the RTTI configuration, a filtering period is set to 20 ms which is the same as the conventional BTTI configuration. This is because the filtering period is a time corresponding to one radio block in the BTTI configuration and is a time corresponding to two radio blocks in the RTTI configuration. The forgetting factor acts similarly as a weighting factor between a previous measurement value and a current measurement value. Thus, the forgetting factor has to vary if the BTTI and the RTTI have different time units. In addition, channel quality for each timeslot and channel quality of all assigned timeslots can directly use the conventional equations.

In another embodiment, the following equations can be taken into consideration for channel quality.

MathFigure 16

$$MEAN\_BEP_{block} = \frac{1}{m}\sum_{a=i}^{i+7}x_a \cdot BEP_{burst\ a}$$ [Math. 16]

MathFigure 17

$$CV\_BEP_{block} = \frac{\sqrt{\frac{1}{m-1}\sum_{b=i}^{i+7}x_b \cdot \left(BEP_{burst\ b} - \frac{1}{m}\sum_{a=i}^{i+7}x_a \cdot BEP_{burst\ a}\right)^2}}{\frac{1}{m}\sum_{a=i}^{i+7}x_a \cdot BEP_{burst\ a}}$$ [Math. 17]

Herein, m is 8 if two radio blocks having the same modulation scheme exist throughput a filtering period (i.e., 20 ms), and m is 4 if one radio block exists throughout the filtering period. $x_a$ and $x_b$ denote existence of a-th and b-th bursts for an (i/2)th or ((i/2)+1)th radio block. Values of the xa and xb indicate '1' in the presence of bursts in the radio block, and indicate '0' in the absence of the bursts in the radio block. Indices i to (i+3) indicate timeslot numbers in one PDCH (indicated by i~(i+3) in FIG. 8). Indices (i+4) to (i+7) indicate timeslot numbers in another PDCH (indicated by i'~(i+3)' in FIG. 8).

Accordingly, there is an advantage in that a more reliable covariance can be provided in comparison with the embodiments of Equations 14 and 15 above. However, there is a need to change the conventional reporting process and to increase the number of timeslots considered for concurrent use. For this reason, the MS has to repot channel quality not in a PDCH unit but in a PDCH-pair unit.

If it is assumed that two RTTI radio blocks having the same modulation scheme always exist throughput the filtering period, there is no difference between the BTTI configuration and the RTTI configuration. According to the embodiments of Equations 14 and 15 above, the same channel quality is reported to the network in both the BTTI configuration and the RTTI configuration. On the contrary, according to the embodiments of Equations 16 and 17, different channel qualities can be reported between the BTTI configuration and the RTTI configuration.

Figure 9:
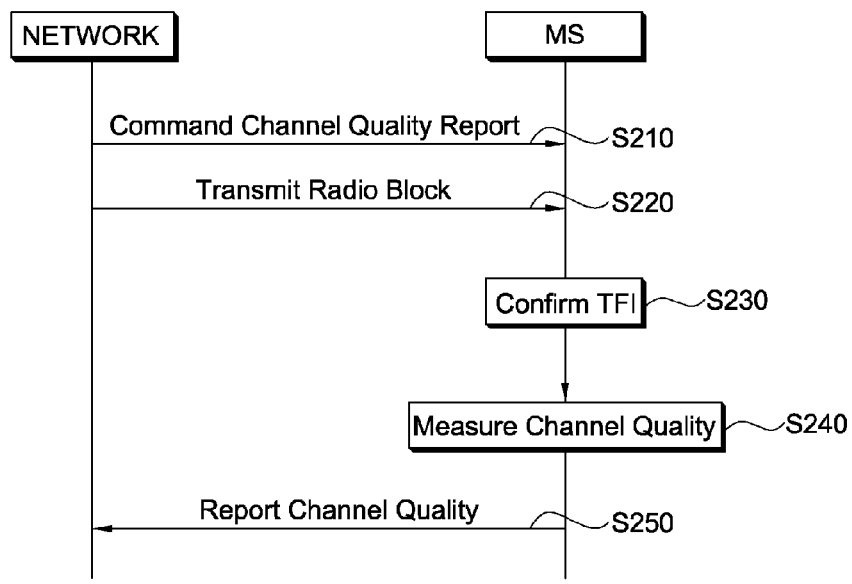
FIG. 9 is a flow diagram showing a method of reporting channel quality according to an embodiment of the present invention.

FIG. 9 is a flow diagram showing a method of reporting channel quality according to an embodiment of the present invention.

Referring to FIG. 9, in step S210, a network transmits a packet downlink assignment message to an MS to command a channel quality report. The packet downlink assignment message is transmitted on a PCCCH or a PACCH to allocate downlink resources to the MS. Further, the packet downlink assignment message can include information on PDCH-pair assignment for the RTTI configuration. The information on PDCH-pair assignment may be reported by a BS to the MS by using a packet timeslot reconfigure message.

In step S220, the network transmits a radio block on the PDCH-pair to the MS. In step S230, the MS determines whether the radio block has an identifier (e.g., TFI) belonging to the MS. The MS measures received signal quality while downlink TBF transmission is achieved. The signal quality is measured for the radio block of the designated MS. The MS determines whether the radio block belongs to the MS by using the TFI. If an RLC/MAC data block is transmitted using the radio block, the MS can confirm the TFI from an RLC/MAC header since the TFI is always included in the RLC/MAC header.

In step S240, upon confirming the TFI, the MS measures channel quality. The MS calculates channel quality for each timeslot-pair and for each modulation type with respect to the radio block including the TFI assigned to the MS. In the RTTI configuration, the MS calculates channel quality for at least one radio block included in two consecutive radio blocks. If the two consecutive radio blocks have the same modulation scheme, channel quality is calculated for the two consecutive radio blocks. If different types of modulation schemes are used or a burst exists only for one radio block, channel quality is calculated for one radio block. A filtering period for measuring channel quality is set to two times longer than a time required to transmit one radio block. That is, the filtering period is set to be equal to a time required to transmit one radio block in the BTTI configuration. For example, the filtering period may be set to 20 ms. The MS calculates a MEAN_BEP_TNn and CV_BEP_TNn for each timeslot-pair and for each modulation type in every 20 ms, and continuously calculates a MEAN_BEPn and CV_BEPn for each modulation scheme when it is time to report the measurement result to the network.

In step S250, the MS reports to the network the channel quality measured for a modulation scheme to be reported. The MS can report the channel quality through the PACCH. The network can perform a link adaptation process by determining a modulation and coding scheme according to the reported channel quality.

In the RTTI configuration, the MS obtains channel quality parameters (i.e., MEAN_BEP_TN and CV_BEP_TN) in a timeslot unit in every 20 ms. In the RTTI configuration, various methods can be used to report the channel quality.

In one embodiment, channel quality can be reported for each PDCH of the PDCH-pair. By reporting the channel quality for each PDCH, the BS can determine whether to use the PDCH-pair. This embodiment can be easily implemented from the perspective of the MS since it is almost the same as a reporting process of the conventional BTTI. From the perspective of the BS, a modulation and coding scheme most suitable for a PDCH-pair consisting of two PDCHs can be obtained by effectively using channel quality which corresponds to each PDCH and which is reported to select a modulation and coding scheme for the PDCH-pair.

In another embodiment, channel quality can be reported for two PDCHs of the PDCH-pair. Various methods can be used for this embodiment. In a first embodiment, the MS may report a worse value between a MEAN_BEP_TN$_n$ of a PDCH1 and a MEAN_BEP_TN$_n$ of a PDCH2 and also report a worse value between a CV_BEP_TN$_n$ of the PDCH1 and a CV_BEP_TN$_n$ of the PDCH2. In a second embodiment, the MS may select a PDCH having a worse value between the MEAN_BEP_TN$_n$ of the PDCH1 and the MEAN_BEP_TN$_n$ of the PDCH2 and report the MEAN_BEP_TN$_n$ and CV_BEP_TN$_n$ for the selected PDCH. In a third embodiment, the MS may select a PDCH having a worse value between the CV_BEP_TN$_n$ of the PDCH1 and the CV_BEP_TN$_n$ of the PDCH2 and report the MEAN_BEP_TN$_n$ and CV_BEP_TN$_n$ for the selected PDCH. In a fourth embodiment, the MS may report a better value between the MEAN_BEP_TN$_n$ of the PDCH1 and the MEAN_BEP_TN$_n$ of the PDCH2 and also report a better value between the CV_BEP_TN$_n$ of the PDCH1 and the CV_BEP_TN$_n$ of the PDCH2. In a fifth embodiment, the MS may select a PDCH having a better value between the MEAN_BEP_TN$_n$ of the PDCH1 and the MEAN_BEP_TN$_n$ of the PDCH2 and report the MEAN_BEP_TN$_n$ and CV_BEP_TN$_n$ for the selected PDCH. In a sixth embodiment, the MS may select a PDCH having a better value between the CV_BEP_TN$_n$ of the PDCH1 and the CV_BEP_TN$_n$ of the PDCH2 and report the MEAN_BEP_TN$_n$ and CV_BEP_TN$_n$ for the selected PDCH. In a seventh embodiment, the MS may report an average value of the MEAN_BEP_TN$_n$ of the PDCH1 and the MEAN_BEP_TN$_n$ of the PDCH2 and report an average value of the CV_BEP_TN$_n$ of the PDCH1 and the CV_BEP_TN$_n$ of the PDCH2.

The reported channel quality parameters are regarded as a representative BEP for physical channel during a reporting period. From the perspective of the BEP, it is better to report worse values to the network. This is because a modulation and coding scheme for the PDCH-pair can be incorrectly selected by overestimating a wireless environment when the values reported to the network is not the worse values.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for enabling a mobile station to report channel quality in a wireless communication system, the method comprising:
    receiving, from a base station, a packet downlink assignment message for requesting to report channel quality parameters, the packet downlink assignment message including a reduced transmission time interval (RTTI) assignment indicating a packet data channel (PDCH) pair including two consecutive timeslots in a time division multiple access (TDMA) frame;
    receiving a first radio block and a second radio block that are intended for the mobile station via the PDCH pair, the first radio block including four bursts transmitted through the PDCH pair in first 10 ms, the second radio block including four bursts transmitted through the PDCH pair in second 10 ms;
    determining the channel quality parameters for the PDCH pair over a filtering period, the filtering period being 20 ms; and
    reporting the channel quality parameters for the PDCH pair to the base station,
    wherein the channel quality parameters include a mean Bit Error Probability (MEAN_BEP) and a coefficient of variation of BEP (CV_BEP),
    wherein if the first radio block and the second radio block use same modulation scheme, the channel quality parameters for the PDCH pair are determined based on the first radio block and the second radio block, and
    wherein if the first radio block and the second radio block use different modulation schemes, the channel quality parameters for the PDCH pair are determined based on one of the first radio block and the second radio block.

2. The method of claim 1, wherein the wireless communication system is an Enhanced General Packet Radio Service (EGPRS) system.

3. The method of claim 1, wherein the first and second radio blocks intended for the mobile station are identified by a Temporary Flow Identity (TFI) included in a Radio Link Control (RLC)/Medium Access Control (MAC) block.

4. A mobile station comprising:
    a Radio Frequency (RF) unit configured to receive radio signals; and
    a processor coupled to the RF unit and configured to:
    receive, from a base station, a packet downlink assignment message for requesting to report channel quality parameters, the packet downlink assignment message including a reduced transmission time interval (RTTI) assignment indicating a packet data channel (PDCH) pair including two consecutive timeslots in a time division multiple access (TDMA) frame;
    receive, from the base station, a first radio block and a second radio block that are intended for the mobile station via the PDCH pair, the first radio block including four bursts transmitted through the PDCH pair in first 10 ms, the second radio block including four bursts transmitted through the PDCH pair in second 10 ms;
    determine the channel quality parameters for the PDCH pair over a filtering period, the filtering period being 20 ms; and
    report the channel quality parameters for the PDCH pair to the base station,
    wherein the channel quality parameters include a mean Bit Error Probability (MEAN_BEP) and a coefficient of variation of BEP (CV_BEP),
    wherein if the first radio block and the second radio block use same modulation scheme, the channel quality parameters for the PDCH pair are determined based on the first radio block and the second radio block, and
    wherein if the first radio block and the second radio block use different modulation schemes, the channel quality parameters for the PDCH pair are determined based on one of the first radio block and the second radio block.

* * * * *